US008600047B2

(12) United States Patent
Michiels et al.

(10) Patent No.: US 8,600,047 B2
(45) Date of Patent: Dec. 3, 2013

(54) EXPONENT OBFUSCATION

(75) Inventors: Wilhelmus P. A. J. Michiels, Eindhoven (NL); Paulus M. H. M. A. Gorissen, Eindhoven (NL)

(73) Assignee: Irdeto Corporate B.V. (NL)

( * ) Notice: Subject to any disclaimer, the term of this patent is extended or adjusted under 35 U.S.C. 154(b) by 99 days.

(21) Appl. No.: 12/991,356

(22) PCT Filed: May 5, 2009

(86) PCT No.: PCT/IB2009/051837
§ 371 (c)(1),
(2), (4) Date: Nov. 5, 2010

(87) PCT Pub. No.: WO2009/136361
PCT Pub. Date: Nov. 12, 2009

(65) Prior Publication Data
US 2011/0064215 A1   Mar. 17, 2011

(30) Foreign Application Priority Data

May 7, 2008 (EP) ..................................... 08155798

(51) Int. Cl.
*H04L 9/00* (2006.01)
(52) U.S. Cl.
USPC ......................................................... 380/28
(58) Field of Classification Search
USPC ......................................................... 380/28
See application file for complete search history.

(56) References Cited

U.S. PATENT DOCUMENTS 5,479,511 A   12/1995   Naccache

FOREIGN PATENT DOCUMENTS

| DE | 100 42 234 A1 | 3/2002 | |
|----|---------------|--------|---|
| FR | 2 818 846 A1 | 6/2002 | |
| JP | H07121107 | 5/1995 | ............... G09C 1/00 |
| JP | 2004004341 | 1/2004 | ............... G06F 7/72 |
| WO | WO-99/35782 | 7/1999 | |
| WO | WO-99/67918 | 12/1999 | |
| WO | WO-01/31436 A1 | 5/2001 | |

OTHER PUBLICATIONS

"International Application No. PCT/IB2009/051837, International Search Report mailed Sep. 8, 2009", 7 pgs.
"International Application No. PCT/IB2009/051837, Written Opinion mailed Sep. 8, 2009", 20 pgs.
Brickell, E. F, et al., "Fast Exponentiation with Precomputation—Extended Abstract", Advances in Cryptology—EUROCRYPT' 92, vol. 658, XP000577415, (1992), 200-207.
Chow, Stanley, et al., "A White-Box DES Implementation for DRM Application", Proceedings of ACM CCS-9 Workshop DRM, (Nov. 18, 2002), 1-16.
Chow, Stanley, et al., "White-Box Cryptography and an AES Implementation", 9th Annual International Workshop, SAC 2002, St. John's Newfoundland, Canada, (Aug. 15-16, 2002), 250-270.
Japanese Office Action issued in corresponding application No. 2011-508041, dated Jul. 31, 2013 (9 pgs).
Messerges et al., "Power Analysis Attacks of Modular Exponentiation in Smartcards," Lecture Notes in Computer Science, 1999, vol. 1717 (15 pgs).
Katoda et al., "Tamper-Resistance Technology by Software Alone," Software Protection Technology Trends (First Volume), Information Processing Society of Japan, Apr. 15, 2005, vol. 46, No. 4, pp. 431-437 (9 pgs). (no translation).
Honda et al., "Analyzing Tamper Resistance of Digital Signature Software by Runtime Data Exhaustive Checking," Proceedings of The 2005 Symposium on Cryptography and Information Security, Maiko Kobe, Japan, Jan. 25-28, 2005 (6 pgs) (no translation).

*Primary Examiner* — Jacob Lipman
(74) *Attorney, Agent, or Firm* — Hayes Soloway P.C.

(57) ABSTRACT

A method of obfuscating an exponent is provided. The method comprises identifying a value $\lambda$ for which it holds that $\lambda>0$ and $x^\lambda=1$ for a plurality of elements x which are to be used in a cryptographic process. The method further comprises identifying an obfuscated exponent y which is greater than $\lambda$ and providing information indicative of the obfuscated exponent y. The method comprises establishing a key value a, wherein $a<\lambda$, selecting a positive integer b, and computing $y=a+b\lambda$.

15 Claims, 4 Drawing Sheets

EXPONENT OBFUSCATION

PRIORITY CLAIM TO RELATED APPLICATIONS

This application is a national stage application under 35 U.S.C. §371 of PCT/IB2009/051837, filed May 5, 2009, and published as WO 2009/136361 A1 on Nov. 12, 2009, which claims priority to European Patent Application No. 08155798.5, filed May 7, 2008, which applications and publication are incorporated herein by reference and made a part hereof in their entirety, and the benefit of priority of each of which is claimed herein.

FIELD OF THE INVENTION

The invention relates to obfuscating an exponent value. The invention also relates to performing an exponentiation operation. The invention also relates to an exponentiation which is part of a cryptographic algorithm.

BACKGROUND OF THE INVENTION

In present days, content is increasingly made available in digital format to users, for example by means of the Internet, a broadcast medium, or by means of a digital data carrier such as CD or DVD. Consumer electronics (CE) products, such as televisions, settop boxes, and audio equipment, are equipped with digital data processing capabilities to render these digital contents.

The use of the Internet and other digital distribution media for copyrighted content has created the challenge to secure the interests of the content provider. In particular it is desirable to have technological means available to enforce the copyrights and business models of the content providers. Increasingly, CE devices are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open and allow computer programmers to inspect the software and to make modifications to the software. In such open systems, including personal computers, some users may be assumed to have complete control over the hardware and software that provides access to the content. Also, some users may have a large amount of time and resources to attack and bypass any content protection mechanisms. As a consequence, content providers must deliver content to legitimate users across a hostile network to a community where not all users or devices can be trusted.

Digital rights management systems have been introduced to control the distribution of digital content to legitimate users. Typically, digital rights management systems use an encryption technique which allows only legitimate users to decrypt the content. The implementation of such encryption techniques in the consumer devices may be obfuscated to make it more difficult for an attacker to find out the value of the key. Examples of ciphers commonly in use for many different kinds of applications are DES, AES, RSA, and the method disclosed in WO9967918.

In relation to key handling, for playback a media player has to retrieve a decryption key from a license database. It then has to store this decryption key somewhere in memory for the decryption of the encrypted content. This gives an attacker two options for an attack on the key. Firstly, reverse engineering of the license database access function could allow the attacker to retrieve asset keys from all license databases. Secondly, by observation of the accesses to memory during content decryption, it is possible to retrieve the asset key. In both cases the key is considered to be compromised.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002 (hereinafter, these two publications will be referred to collectively as "Chow"), disclose methods with the intend to hide the key by a combination of encoding its tables with random bijections representing compositions rather than individual steps, and extending the cryptographic boundary by pushing it out further into the containing application.

The techniques disclosed in Chow make it possible to perform cryptographic operations in software without exposing the cryptographic key to a person who can fully debug the software. In the approach of Chow, the cryptographic key is hidden by using look-up tables rather than mathematical operations, with the result that the operands of the mathematical operations do not have to be stored as such. These tables may be encoded using random bijections to further obfuscate them. The encoding of one table may be undone by the encoding of another table, or may be undone elsewhere in the program. However, not all operations are easily represented by means of a look-up table.

SUMMARY OF THE INVENTION

It would be advantageous to have a way of obfuscating a broader range of operations. To better address this concern, in a first aspect of the invention a method of obfuscating an exponent is presented, comprising identifying a value $\lambda$ for which it holds that $\lambda>0$ and $x^\lambda=1$ for a plurality of elements x which are to be used in a cryptographic process as base values of an exponentiation;

identifying an obfuscated exponent y which is greater than $\lambda$; and providing information indicative of the obfuscated exponent y.

An obfuscated exponent y is thus provided which is larger than strictly necessary for computing the exponentiation. This aspect of the invention uses the insight that for an exponent which is smaller than $\lambda$, corresponding exponent values exist which are larger than $\lambda$ and which give the same outcome when performing the exponentiation. Using this property, the exponent value may be made as large as desired, which is advantageous because it allows to better obfuscate the exponent value against inspection and unauthorized copying.

The exponentiation $x^\lambda=1$ may be performed in a finite algebraic structure, and may be performed, for example, modulo n, where the algebraic structure comprises elements $\{0, 1, \ldots n-1\}$.

The information indicative of the obfuscated exponent y may be provided for use in the cryptographic process. For example, the obfuscated exponent y may be provided to a device which comprises a cryptographic system. By providing the obfuscated exponent y to the device, the device may be caused to use the exponent y in subsequent exponentiation operations. Such a cryptographic system for example implements an asymmetric cipher, such as RSA. In an embodiment, the obfuscated exponent y depends on a private key of the asymmetric cipher. This allows to better protect the private key.

In another aspect of the invention, a system is presented for performing an exponentiation having an obfuscated exponent, comprising a base identifying means for identifying a base x of the exponentiation, wherein x is an element of a set having n elements;

an exponent identifying means for identifying data indicative of an exponent y which is greater than a value $\lambda$ for which it holds that $\lambda>0$ and $\xi^\lambda=1$ for all elements $\xi$ of the set; and an exponentiator for performing at least part of a cryptographic algorithm by computing an outcome of x to the power of y thereby obtaining an outcome of the exponentiation.

The exponent has been obfuscated by increasing its size. This is based on the insight that for any exponent a smaller than $\lambda$, a corresponding exponent value y may be found which is greater than $\lambda$ and which gives the same outcome of the exponentiation. Consequently, this larger value y may be used instead of a, and still provide the same outcome of the exponentiation. Consequently, the exponentiation can be performed without providing the device performing the exponentiation with the relatively small value a. The bit representation of y is typically larger than the bit representation of a. Moreover, such a value y can be selected to be greater than any given size, for example by adding a sufficiently large multiple of $\lambda$ to exponent a. Since the value y may be selected as large as desired, its corresponding bit representation can also be made as large as desired, without changing the outcome of the exponentiation. This makes it more difficult to copy the value y. It allows the number of bits in a key to the cipher to be increased, which increases the security provided by the cipher. Such an approach to exponentiation may be employed to create a white-box implementation of an asymmetric cipher, for example.

In an embodiment the system comprises means for multiplying the base value x by a value $\beta$, and multiplying the outcome of the exponentiation by $\beta^{-y}$. These two multiplications may be used to obfuscate the values of the base x and the outcome of the exponentiation $x^y$. The multiplications may be performed elsewhere, in other modules of a data processing system which uses the exponentiation operation, to prevent an attacker to discover the true values of x and/or $x^y$ by monitoring an input and/or an output of the exponentiator.

In an embodiment a given bit string s may be included in a bit representation of the obfuscated exponent y, by properly selecting a multiple of $\lambda$ to be added to the exponent a. This allows to incorporate information related to existing information, such as passwords, hash values, or hardware identifiers, into the information indicative of the exponent. The system performing the exponentiation may be programmed to retrieve the bit string s by accessing said existing information. The remaining portion of the information indicative of the exponent may be provided by a server, for example.

Further aspects of the invention are defined in the independent claims. The dependent claims define advantageous embodiments.

BRIEF DESCRIPTION OF THE DRAWINGS

These and other aspects of the invention will be further elucidated and described with reference to the drawing, in which.

DETAILED DESCRIPTION OF EMBODIMENTS

A white-box implementation of a cryptographic algorithm is a software implementation in which the cryptographic key may be hidden from an attacker. The attacker may be assumed to have full access to the implementation and full control over the execution environment. It would be advantageous to have an approach for implementing an exponentiation $x^a$ mod n with x variable, such that the value a is hidden from an attacker. As RSA contains such an exponentiation where a is derived from the key, such an approach can be used to derive a white-box implementation of RSA, for example.

Chow et al. present white-box implementation for the symmetric block ciphers AES and DES. The ideas employed by Chow et al. can also be used to some extend to derive white-box implementations of other symmetric block ciphers. However, it is difficult to use the methods disclosed in Chow et al. to derive white-box implementations of asymmetric ciphers such as, for instance, RSA and ElGamal. In this description an approach for deriving a white-box implementation of an exponentiation $a^x$ is disclosed, where a may be constant and x may be variable. Such an exponentiation occurs, for instance, in the ElGamal public key cipher. The most frequently used public key cipher RSA is also based on exponentiation. Encryption of message m corresponds to computing $c=m^e$ mod n, where the values e and n are given by the public key. Decryption of cipher text c corresponds to computing $m=c^d$ mod n, where the value d is given by the private key; the value n is given by p·q for primes p and q and value d can be computed from e and the factoring of n. Note that in both exponentiations the base value is not constant, but depends on the contents of the message. Consequently, an approach is needed for implementing an exponentiation $x^a$ with x variable, such that the value a is hidden from an attacker. This allows to derive a white-box implementation of both the encryption and decryption side of RSA, for example. Also the signature generation and signature verification routines of the RSA signature scheme can be white-boxed based on this approach.

Figure 1:
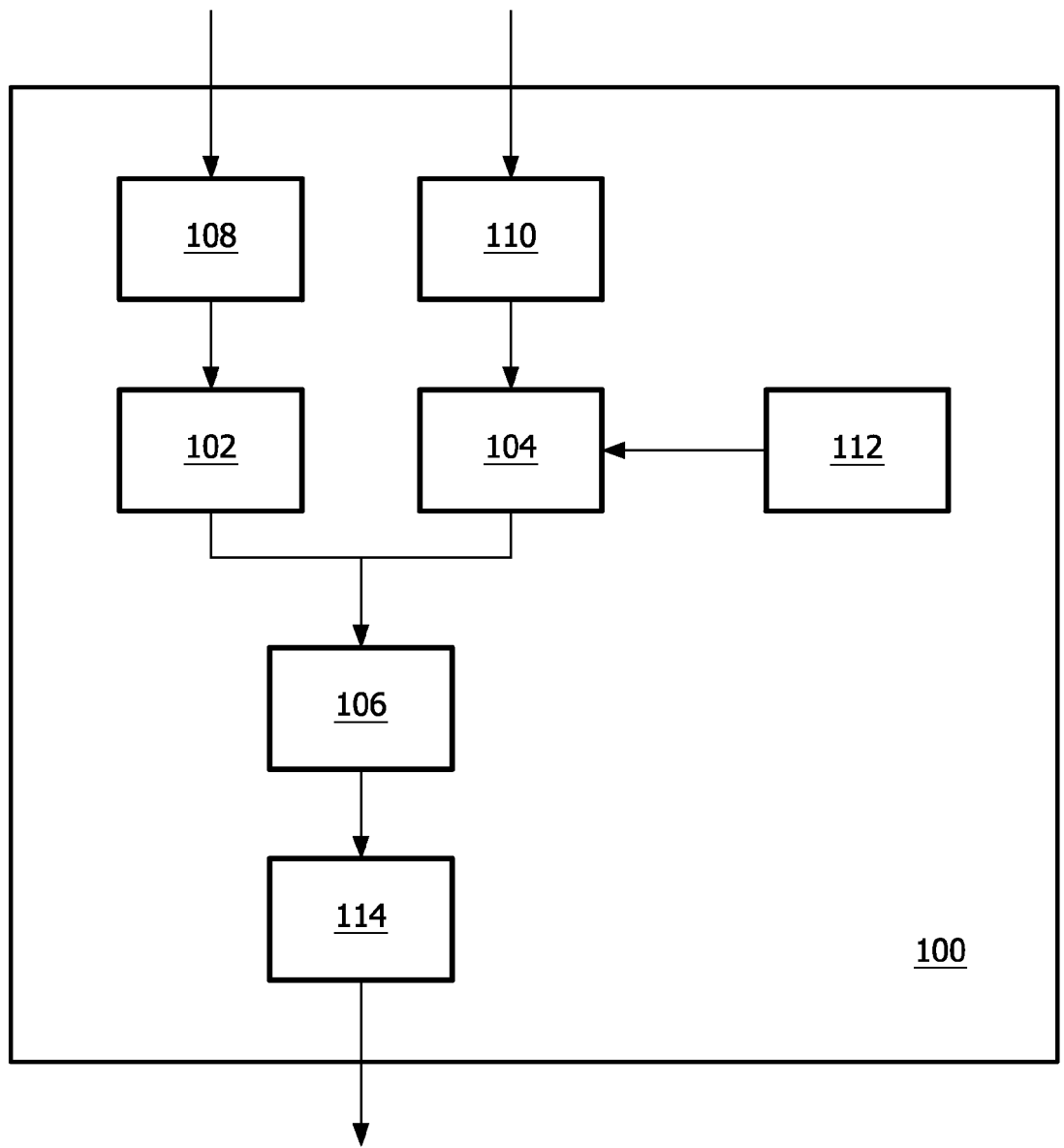
FIG. 1 illustrates a diagram of a system for performing an exponentiation.

FIG. 1 illustrates an embodiment of a system 100 for performing an exponentiation. The exponentiation as performed by the system 100 may have an obfuscated exponent. Such a system may be built into a device which can process content which is protected using digital rights management (DRM), or cryptography, for example. Example devices are a music player, a set-top box, a digital tuner, a digital television, a DVD player. The embodiment allows an exponent of an exponentiation to be represented by a relatively large data representation (e.g., a large number of bits), while making it difficult for a person who intends to compromise the system to replace the large data representation with a smaller one. The system may also be implemented in a personal computer, for example, by means of software.

The system may comprise a base input 108 for receiving data indicative of a base of an exponentiation operation. This base input 108 may be arranged for receiving a digital content stream of encrypted content, for example. However, this is not a limitation. The base input 108 may alternatively be arranged for receiving cryptographic transaction data or identification data, including digital signature data, for example. The base input 108 may also perform pre-processing operations to the data received, for example the data is parsed and unencrypted data portions may be handled differently than encrypted data portions. The data may be retrieved, for example, from a removable media, an internal storage means such as hard disk, flash memory, or RAM, or from a network connection such as cable, satellite (for example using DVB-S), or the Internet. Unencrypted data may be forwarded to another module (not shown). Encrypted data may be forwarded to a base identifying means 102.

The base identifying means 102 receives data indicative of a base value x from the base input 108. This data is used to identify the base x of an exponentiation. For example, the base identifying means 102 receives such a value x from the base input 108. Alternatively, the base identifying means parses the data received from the base input 108 to identify a data field containing the base value x. The base value x is typically a member from an algebraic structure, usually a finite structure, in which a multiplication operation is defined. This multiplication operation also applies when performing exponentiation.

The system further comprises an exponent input 110. This input 110 retrieves data in a way similar to the base input 108. The exponent input 110 may obtain its input from the same data source as the base input 108, or from a different data source. This depends on the application. For example, a separate key server may be provided which sends updated keys to the exponent input 110 from time to time. The exponent input 110 may perform several pre-processing steps and may have more functionality than what is described in this description. However, the exponent input 110 produces data relating to the exponent based on its input, and forwards this data to an exponent identifying means 104.

The exponent identifying means 104 is arranged for identifying data indicative of an exponent y. The data may be identified in the data received from the exponent input 110 and/or from one or more other sources 112 which will be discussed in more detail hereinafter. The exponent identifying means 104 may also extract an actual value of the exponent y from the identified data. For example, data received from the exponent identifying means 104 may be combined with data obtained from the other source(s) 112 in a predetermined way. The exponent identifying means 104 is arranged for identifying relatively large exponent values y. It is assumed here, that a value $\lambda$ exists for which it holds that $x^\lambda = 1$, for the base values x that are identified by the base identifying means 102. The exponent identifying means 104 is arranged for identifying an exponent value y which is greater than the value $\lambda$. To this end, a sufficiently large storage location may be provided to store the large exponent value y. Moreover, the identifying means 104 may be capable of receiving such larger values, by allowing values of exponent y which are larger than $\lambda$ to be received from the exponent input 110 and/or the other source 112. These values y may be more than ten times greater than $\lambda$, as it may be advantageous to enlarge the exponent value in view of cryptographic security. Even the bit length of the identified exponent values y may be more than ten times larger than the bit length of $\lambda$.

The base x identified by the base identifying means 102 and the exponent y identified by the exponent identifying means 104 may be provided to an exponentiator 106. Such an exponentiator may compute the base value x to the power of y. This computation may be performed in a way known in the art. For example, a square and multiply algorithm, known in the art, may be employed for computing the exponentiation with a relatively large exponent value y in an efficient way. The exponentiator 106 is also suitable for handling exponent values y that are larger than $\lambda$. To make the exponentiator 106 suitable for handling these large exponent values, a larger memory location may be used and/or an algorithm may be employed which is particularly suitable for computing exponentiations with large exponents y. The result of the exponentiation, the outcome of $x^y$, is provided to a post-processing unit 114, which may apply additional processing of the outcome of the exponentiation. Such a post-processing unit 114 may be application-dependent, and prepare the data obtained from the exponentiator 106 for further processing in the system. For example, if the outcome of the exponentiation comprises decrypted multimedia content, such further processing may include rendering of video and/or audio content on a display and/or audio system. The post-processing unit 114 may arrange one or more outcomes of exponentiation operations into a format which can be handled by the remainder of the system to perform such rendering, for example.

In an embodiment, the data identified by the exponent identifying means 104 may be indicative of one or more values $y_1, \ldots, y_m$, wherein $m \geq 1$, and wherein the exponentiator is arranged for performing a plurality of exponentiations in dependence on the values $y_1, \ldots, y_m$, wherein the plurality of exponentiations form intermediate steps of the computation of x to the power of y. For example, the data may be indicative of a sequence of one or more exponents $y_1, \ldots, y_m$, wherein $m \geq 1$, wherein a product $$\prod_{i=1}^{m} y_m$$

of the sequence of exponents is equal to y. In such a case, the exponentiator may compute the exponentiation in at least two different ways: first, it may first compute the product $$\prod_{i=1}^{m} y_m$$

to obtain y, and then perform a single exponentiation $x^y$ to obtain the desired result. In this case, an exponentiation with a relatively large exponent value y has to be computed. Second, it may compute a plurality of exponentiations according to $z_1 = x$ and $z_{i+1} = z_i^{y_i}$. This results in $z_{m+1} = x^y$ without actually computing an exponentiation with a large exponent value.

In an embodiment, in the base input 108, or in a part of the system which is responsible for providing data to the base input 108, a means is provided for computing x by multiplying a predetermined value g by a value $\beta$. The predetermined value g may be dependent on encrypted content to be decrypted, for example. This way, an attacker who may be monitoring the data flows of the system, in particular the units 102,104,106, does not see the value g. Similarly, at the post-processing unit 114, or elsewhere in the system, means for multiplying the outcome of the exponentiation by $\beta^{-y}$ may be provided. This results in the value $\beta^{-y}(\beta g)^y = g^y$. Thus, $g^y$ may be computed without exposing either the value g or $g^y$ at the base identifying means 102, the exponent identifying means 104, and the exponentiator 106.

At least part of the data indicative of the exponent y may be derived from information which is unique to a particular device and/or user, or unique to a group of devices and/or users. Such information may be based on a hardware identifier, a user identifier, or a hardware characteristic (such as a clock frequency of a processor or a disk access time), for example. A means 112 may be provided for providing at least part of the data indicative of the exponent y. Means 112 may be arranged to access a memory location in which such data is stored and providing the data to the exponent identifying means 104. The means 112 may also be arranged for computing a hash value of the relevant data and providing the hash value to the exponent identifying means 104. The hash value may be a hash value of some content to be decrypted, or of computer program code, for example. This allows to make the exponent data depend on a relatively large data chunk. The means 112 may be arranged for accessing a memory location comprising a hardware ID of a hardware device such as a hard disk or a processor, for example via a control command sent to the device. This makes it more difficult to successfully perform the exponentiation on other systems, since other systems have other hardware identifiers, which causes a wrong exponent y to be used in the exponentiation.

An exponentiation operation is an important step in RSA decryption and encryption. These steps may be obfuscated using the techniques set forth. Moreover, the key in RSA is closely related to the exponent value y. The techniques set forth allow to express the exponent using a larger value and/or using a plurality of values, which makes the total number of bits needed to store the exponent larger. Moreover, it is difficult for an attacker who does not know the key to find a corresponding exponent value which is smaller and which provides the same exponentiation results. Consequently, larger keys comprising more data bits may be used in conjunction with RSA and other cryptographic algorithms. As in RSA, the decryption key is often the key which is most secret, and for which a large size is an advantage, the exponentiation operation as set forth may be performed advantageously in an RSA decryption system.

The techniques set forth may be included in a consumer electronics device, such as a PDA, music player, digital tuner etc. They provide digital rights management techniques which are difficult to reverse engineer and which may prevent unauthorized copying and/or distributing. The techniques set forth may also be used in transaction processing, digital signatures, and other cryptographic processes and systems.

Figure 2:
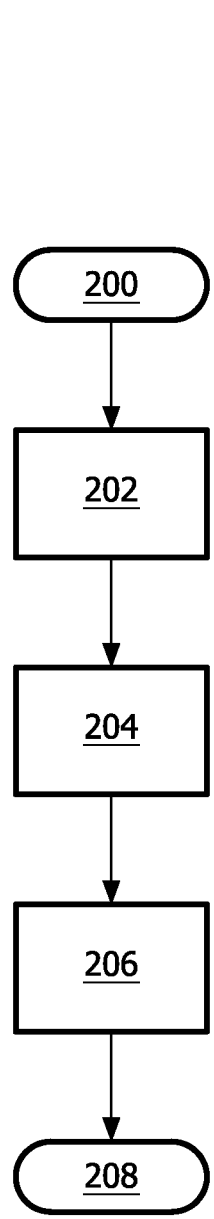
FIG. 2 illustrates a process of performing an exponentiation.

FIG. 2 illustrates a method of performing an exponentiation having an obfuscated exponent. The method is initiated in step 200, for example in response to receiving of an encrypted data packet or in response to a user command. In step 202, a base x of the exponentiation is identified. In step 204, data indicative of an exponent y is identified. The exponent y is greater than a value $\lambda$ for which it holds that $\lambda > 0$ and $x^\lambda = 1$. In step 206, at least part of a cryptographic algorithm is performed by computing x to the power of y thereby obtaining an outcome of the exponentiation. The process ends in step 208 and may be repeated, starting at step 200, for processing a new base value x.

Figure 3:
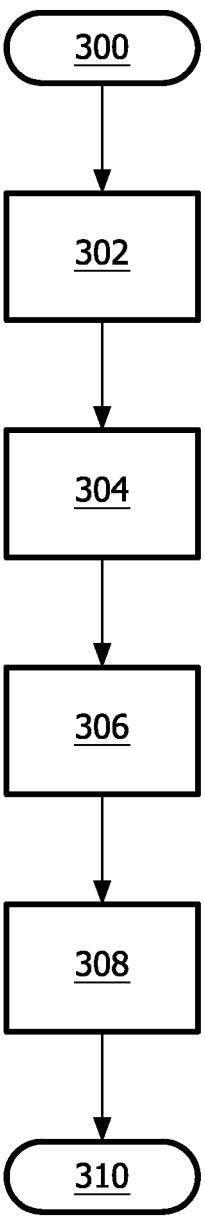
FIG. 3 illustrates a process of generating an exponent value.

FIG. 3 illustrates a method of obfuscating an exponent for use in a cryptographic process. In step 302, an exponent value a of an exponentiation operation of the cryptographic process may be identified. For example, a key generator, as known in the art, may be used to choose a cryptographic key. The exponent value a may be dependent on the key. For example, the exponent value a may be equal to the key.

In step 304, a value $\lambda$ is established for which it holds that $\lambda > 0$ and $x^\lambda = 1$ for a plurality of elements x of an algebraic structure. The plurality of elements x for which $x^\lambda = 1$ includes the potential values that may be used in encrypted messages. To allow a great flexibility in the messages that can be supported, a value $\lambda$ may be established for which $x^\lambda = 1$ is true for all x of an algebraic structure, wherein the algebraic structure may be the set $\{0, 1, 2, 3, \ldots, N-1\}$ with multiplication modulo N. Such a value $\lambda$ may be computed in a way known in the art.

In step 306, an obfuscated exponent y is identified, wherein $y = a + b\lambda$, wherein b is a positive integer. For example, a and $\lambda$ may be established by steps 302 and 304, and b may be a positive integer selected randomly from a range of values which corresponds to a desired approximate bit length of the obfuscated exponent y.

In step 308, information indicative of the obfuscated exponent y is provided. For example, it is stored on a removable media together with encrypted content, or it is transmitted to a client device via a digital network. Also, information indicative of the base value (for example encrypted content) may be provided to the client device.

In step 310, the process terminates. It may be re-initiated at step 300, for example when a new key is being generated.

It is possible to establish one or more values $y_1, \ldots, y_m$, wherein $m \geq 1$, and wherein the values $y_1, \ldots, y_m$ enable to compute an exponentiation to the power of y by performing a plurality of exponentiations in dependence on the values $y_1, \ldots, y_m$, wherein the plurality of exponentiations form intermediate steps of the computation of x to the power of y. This way, the obfuscation can be performed using relatively small exponent values $y_1, \ldots, y_m$. For example, a plurality of values $y_1, \ldots, y_m$ is selected, wherein $m \geq 1$, wherein a product $$\prod_{i=1}^{m} y_m$$

of the sequence of exponents is equal to y. The information indicative of the obfuscated exponent y may be indicative of at least part of the plurality of values $y_1, \ldots, y_m$. In another example, values $y_1, \ldots, y_m$ and $z_1, \ldots, z_m$ are provided, where $$\prod_{i=1}^{m} y_m + \prod_{i=1}^{m} z_m = y.$$

It is possible to identify a bit string s; and to select b such that a bit representation of the obfuscated exponent y contains the bit string s. This will be explained in more detail hereinafter. It can be used, for example, to force the incorporation of a hardware identifier of a client device, or a user name or password, into an exponent value prepared especially for this client or user.

Since the hardware identifier of the client is already known at the client device, and a user name or password may be provided by a user, it is not necessary to transmit the portion of the data corresponding thereto to the client device. Consequently, the bit string s may be omitted when transmitting the information indicative of the exponent value.

In an embodiment, the step 306 of identifying an obfuscated exponent y comprises establishing a multiple k of $\lambda$, say $k\lambda$, and y is determined based on $k\lambda$ rather than $\lambda$. For example, a value of y is selected randomly, within the constraints imposed by a cryptographic cipher used, in a range up to $k\lambda$. In the case of RSA, given an encryption key e, the decryption key d may normally be found by solving $e \cdot d = 1 \mod \lambda$. However, in this embodiment, $\lambda$ is replaced by $k\lambda$, so the decryption key d is found by solving $e \cdot d = 1 \mod k\lambda$. This results in a larger value d, which may be used as an exponent y in RSA.

Figure 4:
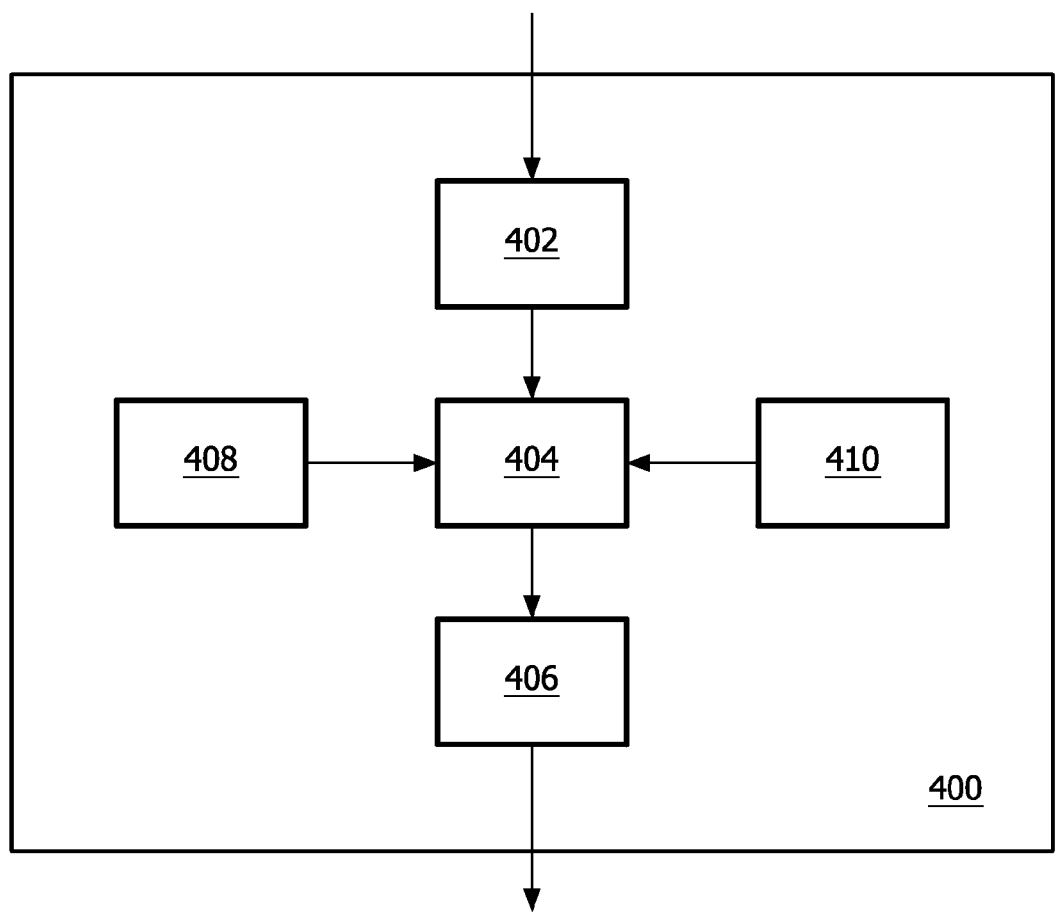
FIG. 4 illustrates a system for generating an exponent value.

FIG. 4 illustrates a system for obfuscating an exponent y for use in a cryptographic process. Such a system may comprise an exponent value identifying means 402 for identifying an exponent value a of an exponentiation operation of the cryptographic process. The system may comprise an exponent lower bound identifying means (not shown) for identifying a value $\lambda$ for which it holds that $\lambda>0$ and $x^\lambda=1$ for a plurality of elements x which are to be used in a cryptographic process. The system may comprise an obfuscator 404 for establishing an obfuscated exponent y, wherein $y=a+b\lambda$, wherein b is a positive integer. The system may further comprise an exponent provider 406 for providing a device with information indicative of the obfuscated exponent y. Such exponent provider 406 may, for example, include the exponent value y into a data stream which is transmitted to a device. The obfuscator 404 may be arranged for receiving the exponent value a and/or the value $\lambda$ from a key provider 408. Such a key provider 408 may comprise a database holding a key for each user or client device, for example. The obfuscator may be arranged for receiving the value b from a random generator 410, for example.

Alternatively, it is also possible to directly generate a large exponent and compute a from this large exponent and $\lambda$.

Figure 5:
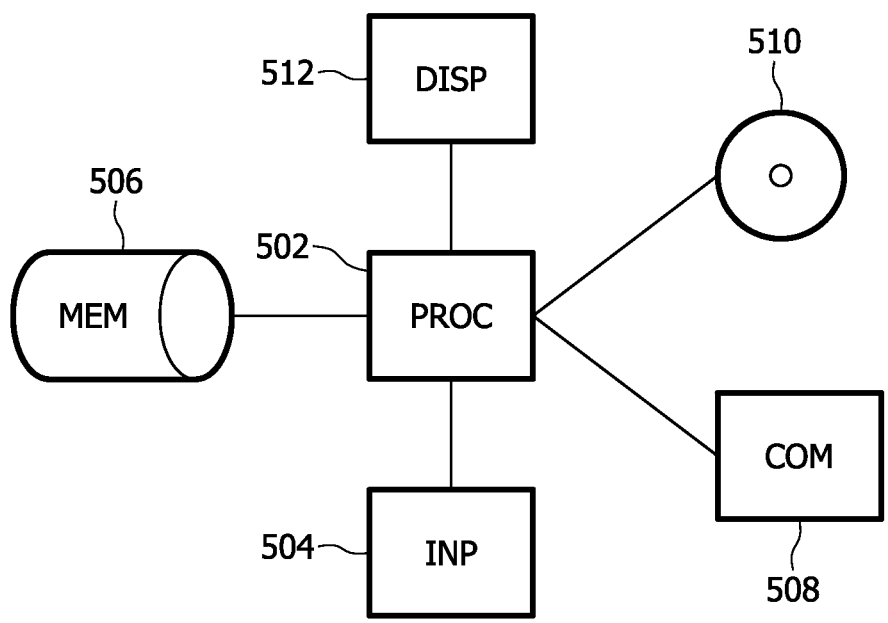
FIG. 5 illustrates a hardware architecture.

FIG. 5 illustrates an example hardware architecture suitable for implementing one or more of the methods and systems as a software program. The program comprises a plurality of machine readable instructions which may be stored in a memory 506. During execution, these instructions are loaded into processor 502 and executed. A communications port 508 is provided for communication with a server to exchange for example data indicative of an exponent and/or a base. Alternatively, the data may be read from or written to a removable media 510, for example a flash memory or a DVD disc. An input 504 is arranged for receiving commands from a user, for example to start and stop playback of a piece of encrypted content. Such commands may trigger initiation of one or more of the methods set forth herein. A display 512 and/or amplifier (not shown) may be provided for providing feedback to the user regarding the state of the program, and/or for rendering decrypted content to a user, for example.

The diagrams in the figures only represent sketches of possible designs of the systems and methods set forth herein. These are not limiting. For example, processing steps may be distributed differently over a plurality of modules and/or units, while still providing the same functionality.

Consider an exponentiation $x^a$ in some algebraic structure G with a multiplicative operation (e.g. a ring for RSA). In this exponentiation, x may be variable. For simplicity, assume that x can be any element of G. The invention easily extends to the case that x is taken from a subset of G. Furthermore, let $\Omega$ be such that $x^\Omega=1$ for all $x \in G$. For instance, if G is a group (which is not the case for RSA), then $\Omega$ can be defined as the order of group G. Then the exponentiation $x^a$ is equivalent to the exponentiation $x^{a+b\Omega}$ for any integer b.

Also, let for any $m \geq 1$ the values $a_1, a_2, \ldots, a_m$ satisfy $$\prod_{i=1}^{m} a_i = a + b\Omega$$

for some integer b. It is possible to compute $x^a$ via $$x^{\prod_{i=1}^{m} a_i} = (\ldots((x^{a_1})^{a_2})\ldots)^{a_m}.$$

Note that $a_1, a_2, \ldots, a_m$ is not necessarily of the same bit-length as a.

It is possible to choose $a_1, a_2, \ldots, a_m$ in such a way that the bit length required to store the exponent a is increased from $k=\lceil \log_2 a \rceil$ to any length $$K = \sum_{i=1}^{m} \lceil \log_2 a_i \rceil.$$

Herein, $K \geq r = \lceil \log_2 \Omega \rceil$. If a is derived from the key, then this means that the key may be enlarged to any size. However, this is not the only way to increase the size of the exponent and/or the key.

Let $\alpha(a_1, a_2, \ldots, a_m)$ be a bit string specifying the values $a_1, a_2, \ldots, a_m$. It is possible to choose the values $a_1, a_2, \ldots, a_m$ properly, such that any pre-specified string (e.g. hardware or user identifier) is included in $\alpha(a_1, a_2, \ldots, a_m)$.

In order to prevent an attacker from extracting knowledge about the computation of $x^a$ from a software program, it may be desirable to bind the computation to the remainder of the program instead of having the computation as an isolated program. This binding preferably involves encoding an input and/or an output of the exponentiation operation. This way, it is more difficult to apply the exponentiation operation successfully outside the context of the application in which it is embedded. Also, it is more difficult to derive useful information by monitoring the input and/or output values of the exponentiation with a debugger, for example. An exponentiation routine for computing $z=x^a$ (or, similarly, $z=x^{\prod_{i=1}^{m} a_i}$) may be bound in this sense to the surrounding program in, for instance, the following way. In the surrounding program $\beta \cdot x$ is computed for some arbitrary value $\beta$. The exponentiation routine then computes $\beta^a \cdot z$ instead of z. To compensate for this, the surrounding program multiplies the outcome of the exponentiation routine by a constant $\beta^{-a}$. These multiplications may be performed in an obfuscated way, for example using look-up tables which combine the multiplication with another processing step, similar to the input and output encodings of Chow et al.

The properties mentioned above apply regardless of the value of m, i.e., they apply for any $m \geq 1$.

In the following, a white box implementation of the decryption algorithm of RSA is described. Although in this description the example of RSA decryption is explained in most detail, this is not a limitation. The techniques disclosed may also be applied to perform RSA encryption, for example, in a similar way. Also, the techniques may be applied to other cryptographic algorithms, including different kinds of encryption, decryption, and digital signature applications.

The RSA public key cipher defines several processes for key generation, encryption, and decryption. These processes are summarized in the following. Key generation may comprise the steps of:

1. Generate 2 large random (and distinct) primes p and q, each roughly the same size.
2. Compute $n=p \cdot q$.
3. Compute $\Phi=(p-1)(q-1)$.
4. Select a random integer e, $1<e<\Phi$, such that $\gcd(e,\Phi)=1$. In this description, gcd means greatest common divisor.
5. Compute a unique integer d, $1<d<\Phi$, such that $e \cdot d=1 \mod \Phi$.
6. Public key is given by: (n,e).
7. Private key is given by: d.

Encryption may comprise the steps of:
8. Identify a plaintext message m.
9. Represent message m as an integer x, $0 \leq x < n$.
10. Cipher text is given by $c=x^e \mod n$.

Decryption may comprise the steps of
11. Identify a ciphertext message c.
12. Integer x is given by $x=c^d \bmod n$.
13. Plaintext message m is a message represented by x.

Given the definition of $\Phi$ in step 3 above, $x^\Phi=1 \bmod n$ for any $0 \leq x < n$. As an example, suppose that $\Phi=(p-1)(q-1)$ is a 1024 bit value. Then the exponent d has at most 1024 bits. Using $\Omega=\Phi$, the exponent d may be hidden in a string of arbitrary size K>1024. First, this is described for the case where m=1. Next, the case of m=2 is described. It will be clear for the skilled person how to implement the case m>2 in view of the description of cases m=1 and m=2.

In the case of m=1, the condition $$\prod_{i=1}^{m} a_i = d + b\Omega$$

can be written as $a_1=d+b\Omega$. For simplicity, define $y=a_1$. This means that $x^d \bmod n$ may be implemented via $x^y \bmod n$. It is possible to find any having a representation with a given bit length K, (wherein the representation does not include leading zeros in the most significant part and K is greater than a bit length of d). Value y is a K-bit value if b satisfies $$\left\lceil \frac{2^{K-1}-d}{\Omega} \right\rceil \leq b \leq \left\lfloor \frac{2^K-1-d}{\Omega} \right\rfloor.$$

To see this, observe that by this choice of b the exponent $d+b\Omega$ satisfies $$2^{K-1} \leq d+b\Omega \leq 2^K-1.$$

Hence, the binary string associated with the value $y=d+b\Omega$ consists of K bits. Consequently, the exponent d has been hidden in the larger, K-bit string y.

It is possible to include an arbitrary bit string in y. Consider a pre-specified string of l bits with $l \leq K-r$. Such a string/may be included in the bit string specifying the exponent y. Let s be the number associated with the bit string of l bits that we want to include. Assume that l=K-r. If l<K-r, some arbitrary bits may be added in front of and/or after the string, for example.

A value S may be obtained from s by extending it to a K-bit value by adding r zero bits to the least significant side of s, i.e., these r zero bits become the least significant bits of S. Note that a binary representation of any value S+x with $x<\Omega$ may start with the binary string for s, i.e., the binary string that we want to include.

Define $$b = \left\lfloor \frac{S-d}{\Omega} \right\rfloor.$$

Consequently, $d+b\Omega \leq S < d+(b+1)\Omega$ and thus $d+b\Omega=S+x$ for an $x<\Omega$. Hence, the binary representation of the exponent $y=d+b\Omega$ starts with the binary string s.

If m=2, then the condition $$\prod_{i=1}^{m} a_i = d + b\Omega$$

can be written as $a_1 \cdot a_2 = d+b\Omega$. This means that $x^d \bmod n$ may be computed as follows.

First, compute $z=x^{a_1} \bmod n$;
next, compute $z^{a_2} \bmod n$. The result is $x^d \bmod n$.

Suppose that it is desired to increase the total bit length of $a_1$ and $a_2$ to any K with $K>r=\lceil \log_2 \Omega \rceil$. This may be realized by choosing values $a_1$ and $a_2$ satisfying $$K = \sum_{i=1}^{m} \lceil \log_2 a_i \rceil.$$

This can be done using the following steps, for example.

Choose $a_1$ as an arbitrary K−r bit value that satisfies gcd $(a_1,\Omega)=1$. Finding such a value $a_1$ is within the reach of the skilled person, in view of this description.

Compute a value $a_2$ that satisfies $a_1 \cdot a_2 = d \bmod \Omega$. The value $a_2$ can be computed as follows. Using Euclid's algorithm, compute a value c that satisfies $a_1 \cdot c = 1 \bmod \Omega$. Value $a_2$ may be computed as $a_2 = c \cdot d \bmod \Omega$, since the values $a_1$ and $a_2$ thus obtained satisfy $a_1 \cdot a_2 = d \bmod \Omega$.

Value $a_1$ is a K−r-bit value and $a_2$ may be an r-bit value. Hence, the storage requirement for storing the exponents used for the computation of $x^d \bmod n$ has increased to K.

The above steps describe, for the case of m=2, a way to hide the exponent d in a larger string.

In an embodiment, a pre-specified bit string is included in an exponent of a white-box implementation. Define $\alpha(a_1, a_2)$ as a function converting $a_1$ and $a_2$ into a bit string specifying $a_1$ and $a_2$. An obvious choice of $\alpha(a_1, a_2)$ is a function which simply concatenates the bit strings associated with $a_1$ and $a_2$. In $\alpha(a_1, a_2)$, a bit string s of length K−r bits with $\gcd(s, \Omega)=1$ may be included by choosing $a_1$ to be equal to s.

It is possible to hide an exponent a in values $a_1, a_2, \ldots, a_m$ with $$\prod_{i=1}^{m} a_i = a + b\Omega,$$

where $\Omega$ satisfies $x^\Omega=1 \bmod n$. In this way, it is possible to increase the storage space needed to store the exponent from $k=\lceil \log_2 a \rceil$ bits to $$K = \sum_{i=1}^{m} \lceil \log_2 a_i \rceil \text{ bits.}$$

In some applications, it may be preferable that, once having the K-bit vector $(a_1, a_2, \ldots, a_m)$, it is difficult for an attacker to decrease the storage size of this K-bit vector (for instance, we may not want the attacker to extract the underlying k-bit exponent a). This property may be referred to by saying that the white-box implementation is "resistant to compaction". It is noted that in order to decrease the storage space needed for storing the K-bit vector $(a_1, a_2, \ldots, a_m)$, it suffices to find a value $c \cdot \Omega$ with $c \leq b$, because $(a+b\Omega) \bmod (c \cdot \Omega)$ is smaller than $a+b\Omega$, but functionally equivalent.

An attacker who intends to find a representation of the exponent which has fewer bits, may, besides the K-bit vector $(a_1, a_2, \ldots, a_m)$, also have additional information to his disposal. Consider, for instance, the case that $(a_1, a_2, \ldots, a_m)$ is used to hide the secret (decryption) exponent d of RSA. Then an attacker typically also has access to the public (encryption) exponent e. These values satisfy $$e \cdot \prod_{i=1}^{m} a_i = 1 \bmod \Omega.$$

Hence, from the above it follows that in order to be resistant to compaction, a desired property of the RSA white-box implementation is the following: Having the public value e and the private values $a_1, a_2, \ldots, a_m$ with $$e \cdot \prod_{i=1}^{m} a_i = 1 \bmod \Omega,$$

then it is still difficult for an attacker to find a value $c \cdot \Omega$ with $c \le b$.

In a more general setting, outside the context of RSA, the following may be observed.

Suppose that an exponent a is hidden in the values $a_1, a_2, \ldots, a_m$ (hence $$\prod_{i=1}^{m} a_i = a + b\Omega).$$

Furthermore, suppose that an attacker can compute some function $f$ with $f(a_1, a_2, \ldots, a_m) = \alpha \cdot \Omega$. Then, in order to be resistant to compaction, it is a desired property that it is difficult for an attacker to derive from $\alpha \cdot \Omega$ a value $c \cdot \Omega$ with $c \le b$.

Note that in the above mentioned example of RSA, the function $f$ may be given by $$f(a_1, a_2, \ldots, a_m) = \left(e \cdot \prod_{i=1}^{m} a_i\right) - 1.$$

Returning to the general setting, two approaches may be identified that might allow an attacker to derive such a value $c \cdot \Omega$ with $c \le b$.

A first approach for finding $c \cdot \Omega$ is the following. By assumption, an attacker can derive some value $f(a_1, a_2, \ldots, a_m) = \alpha \cdot \Omega$. Now, suppose that the attacker is able to derive values $\beta_1, \beta_2$ such that $$\alpha \cdot \Omega = \beta_1 \cdot \beta_2 \quad (1)$$

and $$\beta_1 | \alpha. \quad (2)$$

This would give rise to $\beta_2 = c \cdot \Omega$ for some value c. If values $\beta_1, \beta_2$ are now such that $c \le b$, then $\beta_2$ is a value $c \cdot \Omega$ with $c \le b$. That is, $\beta_2$ can be used to find an exponent $$\tilde{a} = (a + b\Omega) \bmod (c \cdot \Omega) = a + \tilde{b}\Omega$$

where $\tilde{b} < b$.

A second approach for finding a $c \cdot \Omega$ with $c \le b$ is the following. In the second approach, two different, but functionally equivalent white-box implementations $(\tilde{a}_1, \tilde{a}_2, \ldots, \tilde{a}_m)$ and $(\hat{a}_1, \hat{a}_2, \ldots, \hat{a}_m)$ may be used to find a value $c \cdot \Omega$ with $c \le b$. These functionally equivalent white-box implementations give rise to $$\prod_{i=1}^{m} \tilde{a}_i = \tilde{a} = a + b_1 \Omega \text{ and } \prod_{i=1}^{m} \hat{a}_i = \hat{a} = a + b_2 \Omega.$$

Applying function $f$ to $(\tilde{a}_1, \tilde{a}_2, \ldots, \tilde{a}_m)$ and $(\hat{a}_1, \hat{a}_2, \ldots, \hat{a}_m)$ may result in values $\alpha_1 \cdot \Omega$ and $\alpha_2 \cdot \alpha$ for some $\alpha_1$ and $\alpha_2$, respectively. For these two values it holds that $$gcd(\alpha_1 \cdot \Omega, \alpha_1 \cdot \Omega) = gcd(\alpha_1, \alpha_2) \cdot \Omega = c \cdot \Omega,$$

for some value c. If $c \le \min(b_1, b_2)$, then we a further reduction of the white-box implementation is obtained. It is noted that for the attack to be effective for the RSA example, there should not exist a k satisfying $b_2 = b_1 + k\alpha$. Hence, $\hat{a}$ should not be obtained by adding the value $\alpha \cdot \Omega$ multiple times to $\tilde{a}$.

The two attack approaches described above may be counteracted as follows. Prevent an attacker from being able to derive values $\beta_1, \beta_2$ that satisfy (1) and (2), as having these values is the basis of an attack. An approach for making it hard to find such $\beta_1, \beta_2$ is to take care that the factorization of $\alpha$ into prime numbers contains only large prime numbers (preferably the value $\alpha$ is a prime number). Moreover, it is advantageous if the factorization of $\Omega$ contains at least one large prime number. In this respect, a prime number may be regarded to be sufficiently large if it is cryptographically secure, i.e., the constraints to be imposed on the size of said large prime numbers are similar to the constraints commonly imposed on the cryptographically secure prime numbers used in cryptographic algorithms such as RSA.

In more general terms, the elements x which are to be used in the cryptographic process may be elements of an algebraic structure having n elements. In for example RSA, the exponent y, when used as decrypter exponent, may satisfy $e \cdot y = 1 \bmod n$ for a value e. In this case, $e \cdot y - 1 = \alpha \cdot \lambda$ for some value $\alpha$. Such a value $\alpha\lambda$ may be found by an attacker. The step of identifying (306) an obfuscated exponent y may comprise selecting y satisfying that a factorization of $\lambda$ into prime numbers comprises at least one large prime number and a factorization of $\alpha$ into prime numbers comprises only large prime numbers. Such large prime numbers are for example prime numbers large enough to prevent exhaustive search on common computer systems, for example the prime numbers comprise at least 64 bits.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of obfuscating an exponent, comprising:
   identifying, in a computer processor, a value $\lambda$ for which it holds that if $\lambda > 0$ and $x^\lambda$ mod N=1 for a plurality of elements x which are to be used as base values of a modular exponentiation modulo a value N in a cryptographic process, the element x being non-zero;
   identifying an obfuscated exponent y which is greater than $\lambda$, for which it holds that $y = a + b\lambda$ for a key value a, wherein $a < \lambda$, and a positive integer b; and
   providing information indicative of the obfuscated exponent y for use in the cryptographic process, thereby hiding the key value a from an attacker.

2. The method according to claim 1, further comprising establishing one or more values $y_1, \ldots, y_m$, wherein m>1 and wherein the values $y_1, \ldots, y_m$ are indicative of at least a plurality of exponentiations forming intermediate steps of a computation of x to the power of y.

3. The method according to claim 1, further comprising identifying a bit string s; and
   selecting the obfuscated exponent y or the values $y_1, \ldots, y_m$ such that a bit representation of the obfuscated exponent y or of the values $y_1, \ldots, y_m$ comprises the bit string s.

4. A computer program product stored on machine readable media comprising instructions for causing a processor to perform the method according to claim 1.

5. The method according to claim 1, wherein the step of identifying an obfuscated exponent comprises the steps of selecting the positive integer b.

6. The method according to claim 5, wherein the plurality of elements x which are to be used in the cryptographic process are elements of an algebraic structure having n elements, and wherein the obfuscated exponent y is greater than n.

7. The method according to claim 5, wherein the step of identifying a value $\lambda$ comprises selecting the value $\lambda$ such that a factorization of $\lambda$ into prime numbers comprises at least one prime number of at least 64 bits; and wherein the step of identifying an obfuscated exponent y comprises selecting the obfuscated exponent y satisfying that, for a value e defined by $e \cdot y = 1$ mod $\lambda$ and a value a defined by $e \cdot y - 1 = a \cdot \lambda$, a factorization of a into prime numbers comprises only prime numbers of at least 64 bits.

8. A system including a computer processor containing instructions on machine readable media for performing an exponentiation having an obfuscated exponent, comprising:
   a base identifying means for identifying a base x of a modular exponentiation modulo a value N, wherein x is an element of a set having n elements and is non-zero;
   an exponent identifying means for identifying data indicative of an exponent y which is greater than a value $\lambda$, for which it holds that if $\lambda > 0$ and $\zeta^\lambda$ mod N=1 for all elements $\zeta$ of the set; and
   an exponentiator for performing at least part of a cryptographic algorithm by computing an outcome of x to the power of y thereby obtaining an outcome of the exponentiation.

9. The system according to claim 8, further comprising
   means for computing x by multiplying a predetermined value by a value $\beta$; and
   means for multiplying the outcome of the exponentiation by $\beta^{-y}$.

10. The system according to claim 8, further comprising means for deriving at least part of the data indicative of the exponent y from data identifying a device or a user.

11. The system according to claim 8, wherein the cryptographic algorithm is based at least in part on RSA.

12. A consumer electronics device comprising the system according to claim 8.

13. A method of performing an exponentiation having an obfuscated exponent, comprising
   identifying, in a computer processor, a base x of a modular exponentiation modulo a value N wherein x is an element of a set having n elements and is non-zero;
   identifying data indicative of an exponent y, wherein the exponent y is greater than a value $\lambda$, for which it holds that $\lambda > 0$ and $\zeta^\lambda$ mod N=1 for all elements $\zeta$ of the set; and
   performing at least part of a cryptographic algorithm by computing an outcome of x to the power of y thereby obtaining an outcome of the exponentiation.

14. A system including a computer processor containing instructions stored on machine readable media for obfuscating an exponent, comprising
   an exponent lower bound identifying means for identifying a value $\lambda$ for which it holds that $\lambda > 0$ and $x^\lambda = 1$ mod N for a plurality of elements x which are to be processed as base values of a modular exponentiation modulo a value N by a cryptographic system, the element x being non-zero;
   an obfuscator for identifying an obfuscated exponent y which is greater than $\lambda$, for which it holds that $y = a + b\lambda$ for a key value a, wherein $a < \lambda$, and a positive integer b; and an exponent provider for providing information indicative of the obfuscated exponent y to the cryptographic system.

15. A non-transitory computer program product containing a program stored on machine readable media for implementation on a computer processor comprising a cryptographic key, the cryptographic key comprising data indicative of an exponent y which is greater than a value $\lambda$ for which it holds that $\lambda>0$ and $x^\lambda=1 \bmod N$ for a plurality of elements x which are to be used in a cryptographic process having a modular exponentiation modulo a value N, the element x being non-zero.

* * * * *